United States Patent Office 3,134,741
Patented May 26, 1964

3,134,741
PREPARATION OF CELLULAR POLYURETHANE PLASTICS
Rudolf Merten, Cologne-Flittard, Otto Bayer, Leverkusen, Walter Simmler, Cologne-Mulheim, and Günther Loew, Cologne, Germany, assignors to Farbenfabriken Bayer Aktiengesellschaft, Leverkusen, Germany, a corporation of Germany
No Drawing. Filed Apr. 15, 1960, Ser. No. 22,418
Claims priority, application Germany Apr. 17, 1959
11 Claims. (Cl. 260—2.5)

This invention relates to cellular polyurethane plastics and more particularly to an improved method of simultaneously catalyzing the reaction leading to the formation thereof and stabilizing the formation of the resulting cellular framework.

The preparation of cellular polyurethane plastics from organic compounds which contain predominantly primary hydroxyl groups, such as hydroxyl polyesters, is well known. The primary hydroxyl groups fortuitously react at a rapid rate with organic polyisocyanates so that the polymerization reaction will proceed simultaneously with the gas producing reaction between an organic polyisocyanate and water to yield a cellular framework. It is necessary to modify many organic compounds which contain hydroxyl groups in order to incorporate primary hydroxyl groups therein. This is particularly true of polyhydric polyalkylene ethers which are prepared from the condensation of alkylene oxides such as, for example, propylene oxide. The secondary hydroxyl group is not as reactive with an organic polyisocyanate as a primary hydroxyl group. Moreover, the compounds with secondary hydroxyl groups generally have a lower viscosity which makes them more difficult to mix with organic polyisocyanates. Consequently it is difficult to adjust the rate of reaction between an organic polyisocyanate and an organic compound containing secondary hydroxyl groups with the rate of a gas producing system which leads to a cellular product so that the two are harmonized to produce a cellular framework. It is known that certain strong catalysts such as endomethylene piperazine and heavy metal salts will catalyze the reaction between a secondary hydroxyl group and an organic polyisocyanate. The use of these catalysts alone suffers from the disadvantage that the resulting product may not have satisfactory physical properties. Indeed, in some cases the harmony of the reaction is upset to the extent that the reaction product undergoes an initial rise to form a cellular product and then collapses.

It is, therefore, an object of this invention to provide an improved method of adjusting the rate of chemical reaction between an organic compound containing at least two active hydrogen containing groups in the presence of a gas producing agent to obtain a cellular polyurethane plastic. A further object of this invention is to provide an improved method of catalyzing the reaction between an organic polyisocyanate and an organic compound containing at least two active hydrogen containing groups. Still another object of this invention is to provide an improved method of stabilizing the reaction between an organic polyisocyanate and an organic compound containing at least two active hydrogen containing groups, in the presence of a blowing agent, to produce a cellular polyurethane product. A further object of the invention is to provide an improved method of simultaneously catalyzing and stabilizing the reaction between an organic polyisocyanate, an organic compound containing at least two active hydrogen containing groups and water to produce a cellular polyurethane product. Still another object of this invention is to provide an improved catalyst-stabilizer for the production of cellular polyurethane plastics. A further object of the invention is to provide an improved method of reacting an organic polyisocyanate with water and an organic compound containing predominantly secondary hydroxyl groups to produce a cellular polyurethane plastic.

The foregoing objects and others are accomplished in accordance with the invention, generally speaking, by providing a process for the preparation of cellular polyurethane plastics wherein the reaction between an organic polyisocyanate and an organic compound containing at least two active hydrogen containing groups as determined by the Zerewitinoff method is carried out in the presence of a silicone compound containing tin. A preferred embodiment of the invention involves the reaction of an organic polyisocyanate with water and an organic compound containing at least two active hydrogen containing groups as determined by the Zerewitinoff method in the presence of a silicone compound containing tin. While the invention is preferred for the preparation of cellular polyurethane plastics by the reaction of an organic polyisocyanate with an organic compound containing at least two active hydrogen containing groups and predominantly secondary hydroxyl groups and water, it is also applicable to the production of cellular polyurethane plastics where a halohydrocarbon is used as the blowing agent. Suitable halohydrocarbon blowing agents are, for example, dichlorodifluoromethane, trichlorofluoromethane and the like.

Any suitable organic polyisocyanate may be used including, for example, aliphatic, aromatic, aliphatic-aromatic and heterocyclic polyisocyanates. As aliphatic polyisocyanates, one may use, for example, tetramethylene diisocyanate, hexamethylene diisocyanate, ethylene diisocyanate, 1,3,6-hexane triisocyanate and the like. Of course, the aliphatic polyisocyanates may be cycloaliphatic such as, for example, 1,4-cyclohexyl diisocyanate, 1,3,5-cyclohexane triisocyanate and the like. As aromatic polyisocyanates, one may employ the phenylene diisocyanates such as, for example, 1,4-phenylene diisocyanate; the toluylene diisocyanates such as, for example, 2,4-toluylene diisocyanate, 2,6-toluylene diisocyanate and the like as well as mixtures thereof; 4,4'-diphenylmethane diisocyanate, p,p',p''-triphenylmethane triisocyanate, 2,2',4,4'-diphenyl tetraisocyanate and the like. As aliphatic-aromatic isocyanates, one may employ, for example, xylylene diisocyanate such as, 1,4-xylylene diisocyanate and the like. As heterocyclic polyisocyanates, one may employ furfurylidene diisocyanate and the like. Addition products of these polyisocyanates, for example, with a deficient quantity of a low molecular weight alcohol such as glycerine, trimethylol propane, 1,6-hexanetriol, 1,3,6-hexanetriol and the like may also be used. Moreover, addition products of organic polyisocyanates with low molecular weight polyesters such as, castor oil or low molecular weight polyacetals such as the reaction product of formaldehyde and ethylene glycol may also be used. Prepolymers obtained from an excess of an organic polyisocyanate and an organic compound containing at least two active hydrogen containing groups may be used to prepare cellular polyurethane plastics in accordance with the present invention by adding water thereto.

Any suitable organic compound containing at least two active hydrogen containing groups as determined by the Zerewitinoff method may be used in accordance with the present invention to prepare a cellular polyurethane plastic. The organic compound may be either linear or branched and preferably contains predominantly secondary hydroxyl groups. The organic compounds containing at least two active hydrogen containing groups preferably have a molecular weight of at least about 500 and it may be as high as about 10,000 and an —OH equivalent of from about 100 to about 3,000. The —OH equivalent is the amount of the organic compound in grams which contains one mol of hydroxyl groups. If the organic compound containing active hydrogen containing groups is derived from a polyester, it should preferably have an acid number below about 15. Organic compounds containing active hydrogen containing groups which have a molecular weight of from about 1,000 to about 5,000 are particularly suitable. The preferred class of organic compounds containing at least two active hydrogen containing groups is polyhydric polyalkylene ethers in which at least part of the hydroxyl groups are secondary hydroxyl groups. Illustrative examples of such compounds are as follows:

(1) Condensation products of alkylene oxides such as, for example, propylene oxide, the butylene oxides such as, 1,2-butylene oxide, amylene oxide and the like, styrene oxide, epichlorohydrin and the like.

(2) Condensation products of the afore-mentioned alkylene oxides with polyhydric alcohols and phenols such as, for example, alkanediols such as, ethylene glycol, propylene glycol, butylene glycol, amylene glycol, alpha-omega-decamethylene glycol and the like; alkane triols such as, for example, glycerine, 1,3,6-hexanetriol and the like; alkene diols such as, for example, ethylidene diol, 3-hexene-1,6-diol and the like; alkine diols such as, for example, 3-hexine-1,6-diol and the like as well as polyethylene glycols, polypropylene glycols, trimethylol propane, pentaerythritol, hydroquinone, 4,4'-dihydroxydiphenylmethane, 4,4' - dihydroxydiphenyldimethylmethane and hydrogenation products thereof, 1,5-dihydroxy naphthalene and the like.

(3) Addition products of the afore-mentioned alkylene oxides with aliphatic or aromatic mono- or poly-primary amines as well as secondary amines, all of which must contain at least two active hydrogen atoms, such as, for example, aliphatic amines such as ethyl amine, propyl amine and the like, alkylene diamines such as ethylene diamine, 1,3-propylene diamine, 1,4-butylene diamine, 1,6-hexamethylene diamine and the like; diethylene triamine, aromatic amines such as aniline, phenylene diamine, benzidine, and the like and heterocyclic amines such as piperazine and the like.

(4) Condensation products of the above-defined alkylene oxides with amino alcohols which contain at least two active hydrogen atoms such as, for example, ethanol amine, N-alkyl ethanol amines such as, for example, N-methyl ethanol amine, N-ethyl ethanol amine and the like; diethanolamine, N-alkyl diethanolamines such as for example, N-methyl diethanolamine, N-ethyl diethanolamine, triethanolamine and the like.

(5) Condensation products of the above-defined alkylene oxides with polyesters containing at least two hydroxyl groups such as castor oil or other compounds containing a plurality of active hydrogen atoms such as sugar.

Ethylene oxide may be partially incorporated into the preferred compounds of this invention by carrying out the condensation of the above-described alkylene oxides in the presence of some ethylene oxide or by subsequently condensing the polymers recited under 1 through 5 above with ethylene oxide. The resulting organic compounds containing at least two active hydrogen containing groups which also contain a minor proportion of condensed ethylene oxide do not differ substantially from the modified polymers set forth under 1 through 5 with regard to their reactivity with organic polyisocyanates.

In addition to the polyhydric polyalkylene ethers, hydroxyl polyesters which contain major proportions of secondary hydroxyl groups may be used. These hydroxyl polyesters are prepared by reacting one or more of the above-described polyhydric alcohols including the amino alcohols with a quantity of polycarboxylic acid such as, for example, succinic acid, adipic acid, dimerized and trimerized fatty acids, phthalic acid, maleic acid, fumaric acid and the like. Of course, some of the polyhydric alcohols may contain secondary hydroxyl groups which will still be present in the final product.

In addition to those organic compounds containing at least two active hydrogen containing groups which contain predominantly secondary hydroxyl groups, one may also use organic compounds which contain primary hydroxyl groups or other terminal groups containing active hydrogen such as, for example, amino groups, carboxyl groups, —SH groups, urethane groups, urea groups, amide groups and the like. Therefore, the process of the present invention does not exclude the preparation of cellular polyurethane plastics from hydroxyl polyesters, the conventional polyhydric polyalkylene ethers which contain predominantly primary hydroxyl groups, polyhydric polythioethers, polyacetals and the like. The polyesters may in this instance be prepared from any suitable polyhydric alcohol and any suitable polycarboxylic acid including those set forth above such as, for example, the reaction product of ethylene glycol and adipic acid. The polyhydric polyalkylene ethers may be prepared by the condensation of, for example, ethylene oxide per se, or in admixture with a minor amount of one of the above-described alkylene oxides which yield predominantly secondary hydroxyl groups or in admixture with an alkylene glycol or other polyhydric alcohol which would produce no secondary hydroxyl groups. Polythioethers may be obtained from thiodiglycol or by the condensation of any other suitable thioetherglycol with a polyhydric alcohol such as those more particularly set forth above. Polyacetals may be obtained by the reaction of an aldehyde such as formaldehyde, for example, with a polyhydric alcohol such as ethylene glycol, for example. Any of the active hydrogen containing compounds used in the present invention may contain other groups in the chain such as, for example, tertiary nitrogen atoms, carbonamide groups, urea groups, urethane groups and the like as well as sulfur and oxygen bridges. The types of organic compounds containing at least two active hydrogen containing groups which are contemplated by the invention are well known in the art and a further discussion thereof is not necessary to enable those skilled in the art to practice the invention.

Any suitable silicone compound containing tin may be used in accordance with the process of the present invention. To produce the stabilizing effect, the silicone compounds containing tin should contain at least one siloxane chain in the molecule. In other words, the catalyst-stabilizers of the invention may be organo-tin compounds containing a siloxane chain. Silane linkages or free silicon atoms may be present also. Moreover, the silicone compounds of the invention may be substituted on the silicon atom with any suitable organic radical such as those more particularly set forth below. The tin atoms are normally incorporated into the molecule by means of Sn—O—Si bonds and they too may be substituted with any suitable organic radical. The organic radicals for substitution on the silicone atom or tin atom may be, for example, aliphatic, aromatic or heterocyclic radicals.

The organic radicals may be substituted with any substituent which does not interfere with the catalytic activity of the silicon compound containing tin such as, for example, halogeno such as, for example, chloro, bromo iodo, fluoro and the like; nitro; alkoxy such as, for example, methoxy, ethoxy, propoxy, butoxy, amoxy and the like; carboalkoxy such as, for example, carbomethoxy, carbethoxy and the like; dialkyl amino such as, for example, dimethyl amino, diethyl amino, dipropyl amino, methylethyl amino and the like; mercapto; carbonyl; thiocarbonyl; hydroxy; phosphato; phosphoryl and the like.

When aliphatic radicals are the organic radicals they may be for example, alkyl, alkenyl, aralkyl and/or aralkenyl.

Any suitable alkyl radical may be the organic radical such as, for example, methyl, ethyl, n-propyl, isopropyl, n-butyl, isobutyl, sec-butyl, t-butyl, n-amyl and various isomers thereof such as, for example, 1-methyl-butyl, 2-methyl-butyl, 1,1-dimethylpropyl, 1,2-dimethylpropyl, 2,2-dimethylpropyl, 1-ethylpropyl and the like and the corresponding straight and branched chain isomers of hexyl, heptyl, octyl, nonyl, decyl, undecyl, dodecyl, tridecyl, tetradecyl, pentadecyl, hexadecyl, heptadecyl, octadecyl, nondecyl, eicosyl and the like.

Any suitable alkenyl radical may be the organic radical such as, for example, ethenyl, 1-propenyl, 2-propenyl, isopropenyl, 1-butenyl, 2-butenyl, 3-butenyl and the corresponding branched chain isomers thereof such as, for example, 1-isobutenyl, 2-isobutenyl, 1-sec-butenyl, 2-sec-butenyl, including 1-methylene-2-propenyl, 1-pentenyl, 2-pentenyl, 3-pentenyl, 4-pentenyl and the corresponding branched chain isomers thereof; 1-hexenyl, 2-hexenyl, 3-hexenyl, 4-hexenyl, 5-hexenyl and the corresponding branched chain isomers thereof such as, for example, 3,3-dimethyl-1-butenyl, 2,3-dimethyl-1-butenyl, 2,3-dimethyl-2-butenyl, 2,3-dimethyl-3-butenyl, 1-methyl-1-ethyl-2-propenyl and the various isomers of heptenyl, octenyl, nonenyl, decenyl, undecenyl, dodecenyl, tridecenyl, tetradecenyl, pentadecenyl, hexadecenyl, heptadecenyl, octadecenyl, nondecenyl, eicosenyl and the like.

Any suitable aralkyl radical may be the organic radical such as, for example, benzyl, α-phenyl-ethyl, β-phenyl-ethyl, α-phenyl-propyl, β-phenyl-propyl, gamma-phenyl-propyl, α-phenyl-isopropyl, β-phenyl-isopropyl, α-phenyl-butyl, β-phenyl-butyl, gamma-phenyl-butyl, delta-phenyl-butyl, α-phenyl-isobutyl, β-phenyl-isobutyl, gamma-phenyl-isobutyl, α-phenyl-sec-butyl, β-phenyl-sec-butyl, gamma-phenyl-sec-butyl, β-phenyl-t-butyl, α'-naphthyl-methyl, β'-naphthyl-methyl and the corresponding α'- and β'-naphthyl derivatives of n-amyl and the various positional isomers thereof such as, for example, 1-methyl-butyl, 2-methyl-butyl, 3-methyl-butyl, 1,1-dimethyl-propyl, 1,2-dimethyl-propyl, 2,2-dimethyl-propyl, 1-ethyl-propyl and said derivatives of the corresponding isomers of hexyl, heptyl, octyl and the like including eicosyl and the corresponding alkyl derivatives of phenanthrene, fluorene, acenaphthene, crysene, pyrene, triphenylene, naphthacene and the like.

Any suitable aralkenyl radical may be the organic radical such as, for example, α-phenyl-ethenyl, β-phenyl-ethenyl α-phenyl-1-propenyl, β-phenyl-1-propenyl, gamma-phenyl-1-propenyl, α-phenyl-2-propenyl, β-phenyl-2-propenyl, gamma-phenyl-2-propenyl, β-phenyl-isopropenyl and phenyl derivatives of the isomers of butenyl, pentenyl, hexenyl, heptenyl up to and including eicosenyl and other aromatic derivatives of alkenyl, that is alkenyl radicals derived from naphthalene, phenanthrene, fluorene, acenaphthene, chrysene, pyrene, triphenylene, naphthacene and the like.

Any suitable cycloalkyl radical may be the organic radical such as, for example, cyclopropyl, cyclobutyl, cycloamyl, cyclohexyl, cycloheptyl, cyclooctyl, cyclononyl, cyclodecyl, cycloundecyl, cyclododecyl, cyclotridecyl, cyclotetradecyl, cyclopentadecyl, cyclohexadecyl, cycloheptadecyl, cyclooctadecyl, cyclononadecyl, cycloeicosyl, α-cyclopropyl-ethyl, β-cyclopropyl-ethyl, α-cyclobutyl-propyl, β-cyclobutyl-propyl, gamma-cyclobutyl-propyl, α-cycloamyl-isopropyl, β-cycloamyl-isopropyl and the like.

Any suitable cycloalkenyl radical may be the organic radical such as, for example, α-cyclohexyl-ethenyl, β-cyclohexyl-ethenyl, α-cycloheptyl-1-propenyl, β-cycloheptyl-1-propenyl, gamma-cycloheptyl-1-propenyl, α-cyclooctyl-2-propenyl, β-cyclooctyl-2-propenyl, gamma-cyclooctyl-2-propenyl, β-cyclononyl-isopropenyl, α-methylene-β-cyclododecyl-ethyl and the like.

Any suitable aryl radical may be the organic radical such as, for example, phenyl, α-naphthyl, β-naphthyl, α-anthryl, β-anthryl, gamma-anthryl including the various monovalent radicals of indene, isoindene, acenaphthene, fluorene, phenanthrene, naphthacene, chrysene, pyrene, triphenylene and the like.

Any suitable alkaryl radical may be the organic radical such as, for example, o-tolyl, m-tolyl, p-tolyl, 2,3-xylyl, 2,4-xylyl, 2,5-xylyl, 2,6-xylyl, 3,4-xylyl, 3,5-xylyl, o-cumenyl, m-cumenyl, p-cumenyl, mesityl, o-ethylphenyl, m-ethylphenyl, p-ethylphenyl, 2-methyl-α-naphthyl, 3-methyl-α-naphthyl, 4-methyl-α-naphthyl, 5-methyl-α-naphthyl, 6-methyl-α-naphthyl, 7-methyl-α-naphthyl, 8-methyl-α-naphthyl, 1-ethyl-β-naphthyl, 3-ethyl-β-naphthyl, 4-ethyl-β-naphthyl, 5-ethyl-β-naphthyl, 6-ethyl-β-naphthyl, 7-ethyl-β-naphthyl, 8-ethyl-β-naphthyl, 2,3-dipropyl-α-naphthyl, 5,8-diisopropyl-β-naphthyl and the like.

Any suitable heterocyclic radical may be the organic radical such as, for example, furfuryl, pyryl and the like.

Higher valent radicals are those derived from divalent and higher valent polyhydroxy compounds, such as ethylene glycol, diethylene glycol, the polyethylene glycols, propylene glycol, dipropylene glycol, the polypropylene glycols, polytetrahydrofuran and mixed polyethers thereof, glycerol, trimethylol propane, trimethylolethane, pentaerythritol, hexitol and the alkoxylation products of these polyalcohols.

The silicone compounds preferably contain tetravalent tin and preferably have each tin atom bonded to at least one carbon atom by a direct carbon to tin bond. A preferred class of compounds are the stannosiloxanes.

To summarize, the silicon compounds containing tin as employed in the present invention can be looked at as comprising essentially building blocks of the following type

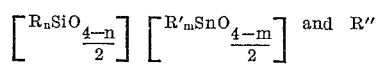

wherein $n$ denotes 0, 1, 2, 3; $m$, 0, 1, 2, 3 and preferably 1, 2, 3; R and R' are monovalent organic radicals as listed above; R'' is polyvalent organic radical derived from the polyhydric alcohols listed above by removing the hydrogen and half of the oxygen of each hydroxyl group.

The silicon compounds containing tin, therefore, include those having recurring group

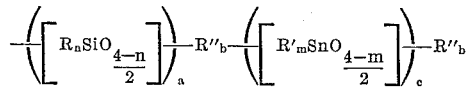

wherein $a$ and $c$ are integers and $b$ are integers including zero.

The silicon compound containing tin may be prepared in accordance with processes known in the art. For example, they may be prepared by the transesterification of the silanol compound containing an

group with an alkoxy tin compound of the formula $R_nSn(OR')_{4-n}$ wherein R is an organic radical as defined above and $n$ is an integer of from 1 to 3, ROH being split off in the reaction. In addition, the stabilizer-catalyst of the present invention may be prepared by reacting a silanol salt such as the sodium salt of trimethyl silanol with a tin halide having the formula $R_nSnX_{4-n}$ wherein R is an organic radical as defined above, $n$ is an integer of from 1 to 3 and X is halogen such as chlorine, bromine, iodine and the like, the metal halide being split off. Moreover, the catalysts may be prepared by reacting an alkoxy silane such as trimethylmethoxy silane or an alkoxy siloxane such as a polydimethylmethoxy siloxane containing

groups wherein R has the meaning set forth above with a tin halide of the formula $R_nSnX_{4-n}$ in which R, $n$ and X are as described above or with a tin acylate of the formula $R_nSn(OCOR)_{4-n}$ wherein R is an organic radical as defined above, an alkyl halide such as, for example, ethyl chloride, benzyl chloride, chlorobenzene and the like or an alkyl ester such as, for example, acetoacetic ester or other ester having the formula ROCOR wherein R is an organic radical as defined above, being split off in the reaction. The latter reactions may advantageously be carried out in the presence of a catalyst such as, for example, acetyl chloride. The silicon compounds containing tin of the present invention may also be prepared by reacting a halosilane or a halosiloxane such as, for example, trichloromethyl silane, polydichloromethyl-silane and the like with an alkyl tin acylate such as, for example, dibutyltin-diacetate, the corresponding acyl-halide being split off. The tin containing portion of the molecule may be bonded to the siloxane portion through —Sn—C—O bonds in a simple manner by the transesterification of alkoxy tin compounds of the following formula, for example, $R_nSn(OR)_{4-n}$ wherein R and $n$ are as defined above with a silane or siloxane containing free hydroxyl groups on a carbon atom and which is in turn linked to a silicon atom either directly or through ether oxygen bridges or by reaction of the corresponding alcoholate with a tin halide under anhydrous conditions.

The silanes and siloxanes to be employed in the production of the silicon compounds containing tin may be derived from monomers of the general formula $R_nSiX_{4-n}$ in which $n$ is 0, 1, 2 or 3, R is an organic radical as more particularly set forth above and X represents a hydrolyzable group such as a halogen atom such as chlorine, bromine, iodine and the like, an amino group or an alkoxy group such as methoxy, ethoxy, propoxy, butoxy, amoxy, and the like. If desired, hydrocarbon radicals and/or hydrocarbon radicals interrupted by ether oxygen atoms may be incorporated into the silicone portion of the molecule by condensing the afore-mentioned silane compounds in the presence of a polyhydric alcohol or alkylene oxide. Silicone compounds which have terminal hydroxyl groups in the molecule may be obtained by employing an excess of the polyhydric alcohol or alkylene oxide. Suitable polyhydric alcohols are, for example, ethylene glycol, propylene glycol, butylene glycol, glycerine, trimethylol propane, polyethylene glycols, polypropylene glycols and the like. Alkylene oxides which may be used are, for example, ethylene oxide, propylene oxide, butylene oxide, epichlorohydrin, styrene oxide and the like as well as reaction products thereof with polyhydric alcohols such as, for example, glycerine, trimethylol propane, 1,3,6-hexane triol, castor oil, sugar and the like. The silicone compounds may also be modified to contain monofunctional alkoxy radicals of higher molecular weight by reaction with, for example, higher alcohols such as stearyl alcohol or with adducts of the afore-mentioned alkylene oxides with monofunctional alcohols or phenols such as methanol, ethanol, propanol, butanol, benzyl alcohol, phenol and the like, these radicals being split off when the tin components are subsequently introduced into the molecule. Of course, it is also possible to introduce the monofunctional alkoxy or aroxy radicals into the molecule after the incorporation of the tin compound. Further, the silicone compounds containing tin may contain the stannoxane grouping Sn—O—Sn in which each tin atom is attached to 1 or 2 organic radicals as defined above by means of a direct carbon to tin bond. It is not necessary to employ stoichiometric quantities of the tin portion and the silicone portion and minor amounts of each in the molecule are contemplated by the invention. Further, the silicon compounds which contain tin may also contain functional groups such as, for example, hydroxyl groups, halogen groups, such as chlorine, bromine and iodine, alkoxy groups such as, for example, methoxy, ethoxy, propoxy, butoxy and the like and ester groups such as acyl groups and the like in a terminal portion. Depending on the nature of the starting materials one may produce linear or branched silicon containing compounds of relatively high or low molecular weight and which may be either water soluble or hydrophobic. Moreover, the silicone compounds containing tin may be mixed in any desired manner.

The silicone compounds containing tin which are employed in accordance with the present invention may be solid, amorphous, crystalline, pasty or even liquid products and may be incorporated into the reaction components in various fashions. Thus, the liquid compounds are generally compatible with the hydroxyl polyesters and/or polyethers and may be added directly thereto while the water soluble compounds may be introduced into the aqueous portion of the reactants. Solid compounds can be dissolved in solvents such as acetone, aromatic hydrocarbons, such as, for example, benzene, toluene, xylene and the like, chlorinated hydrocarbons such as orthene and the like, ethers such as dibutyl ether and the like or any other suitable organic solvent. Moreover, the reaction can be carried out in the presence of the solid compound by adding it in the form of a paste, for example to the organic compound containing at least two active hydrogen containing groups.

The quantity of the catalyst will vary depending on the nature and composition of the reaction mixture, the amount of the active tin in the silicon compound and also vary according to the compounds which are used. However, catalytic amounts are sufficient. In general, amounts within the range of from about 0.01 percent to about 5 percent by weight based on the total weight of the reaction mixture are preferred.

The cellular polyurethane plastics are prepared by the simultaneous and intensive mixing of the components which include the organic compound containing at least two active hydrogen containing groups, organic polyisocyanate, water or other blowing agent as well as other additives, if desired. The mixing is preferably carried out in a machine mixer such as is disclosed, for example, in U.S. Reissue Patent 24,514. In addition to the already mentioned components, it is possible to use other stabilizers, catalysts, coloring agents, fillers and the like. Suitable catalysts are, for example, N-ethyl morpholine, N-methyl morpholine, triethylene diamine, dimethyl benzylamine, endoethylene piperazine in small quantities, 1-alkoxy-3-dialkyl aminopropanes, such as 1-ethoxy-3-dimethyl aminopropane and the like, permethylated-N-ethyl amino piperazine and the like as well as tin containing compounds such as, for example, dibutyl-tin-di-2-ethylhexoate, dibutyl-tin-dilaurate, stannous octoate and others disclosed in copending application Serial No. 771,242, filed November 3, 1958.

One may also employ, in conjunction with the catalyst-stabilizers of the present invention, emulsifiers such as sulphonated castor oil and adducts of ethylene oxide with hydrophobic compounds containing one or more active hydrogen containing groups, dyestuffs, fillers, flame-proofing agents, plasticizers and other stabilizers including silicone alkylene oxide copolymers such as those disclosed in German patent specification No. 1,040,251 as laid open to public inspection and silicone compounds containing basic nitrogen atoms as described in copending application Serial No. 851,956, filed November 10, 1959, now U.S. Patent No. 3,070,556, and paraffin oils.

The cellular polyurethane plastics of the invention are useful in many applications including both thermal and sound insulation, cushioning and other upholstery articles, toys and the like.

The invention is further illustrated by the following examples in which the parts are by weight unless otherwise indicated.

*Example 1*

About 100 parts of a linear polypropylene glycol (—OH number about 56), about 39 parts of a toluylene diisocyanate containing the 2,4- and 2,6-isomers in a ratio of 80:20, about 1.5 parts of a water soluble siloxane-alkylene oxide copolymer, about 0.7 part of a stannosiloxane which has been prepared by the transesterification of about 37.8 parts of tetraethoxy-1,3-diphenyl disiloxane and about 140.4 parts of dibutyl-tin-diacetate (refractive index $n_D^{20}=1.5142$), about 0.8 part of permethylated N-aminoethyl-piperazine and about 3.0 parts of water are mechanically mixed in the apparatus described in U.S. Reissue Patent 24,514, whereby a foam material is produced which reaches its full height in about 2 minutes and hardens after approximately 20 to 30 minutes to give a product having good strength and elasticity.

*Example 2*

About 89 parts of tetramethyl-1,3-diethoxy-disiloxane and about 60 parts of anhydrous polyethylene glycol (molecular weight about 300) are transesterified at 150° C./12 mm. Hg and then at 130° C./12 mm. Hg after adding about 70.2 parts of dibutyl-tin-diacetate and about 1 ml. of acetyl chloride to give about 156 parts of a viscous stannosiloxane-polyethylene glycol copolymer having a refractive index $n_D^{20} = 1.4657$.

About 100 parts of a branched polypropylene glycol (—OH number about 56) which has been prepared by the addition of propylene oxide to a mixture of propane-1,2-diol and hexane-triol in a molar ratio of about 1:1, about 37 parts of the toluylene diisocyanate employed in Example 1, about 1.0 part of a water soluble siloxane-alkylene oxide copolymer, about 0.5 part of the previously described stannosiloxane-polyethylene glycol copolymer, about 0.2 part of endoethylene piperazine and about 2.8 parts of water, are mechanically mixed. A quickly rising and setting foam material having excellent mechanical properties is thereby obtained.

*Example 3*

About 44.4 parts of 1,3-diethoxy tetramethyldisiloxane and about 120 parts of anhydrous polyethylene glycol having a mean molecular weight of about 300 are initially transesterified at about 150° C./12 mm. Hg until all the ethanol is split off. About 59 parts of dibutyl-dimethoxytin are then added and the mixture is distilled at about 150° C./12 mm. Hg until all the methanol has been removed. About 184 parts of a viscous oil having a refractive index $n_D^{20} = 1.4774$ are obtained as residue.

About 100 parts of a branched polypropylene glycol (—OH number about 55) which has been prepared by adding propylene oxide to trimethylol propane, about 40 parts of the toluylene diisocyanate employed in Example 1, about 1.2 parts of a water soluble siloxane-alkylene oxide copolymer, about 0.4 part of the catalyst prepared as described above, about 1.0 part of 1-ethoxy-3-dimethylamino propane and about 3.1 parts of water are mixed together. A quickly rising and setting foam having good strength and elasticity is thereby obtained.

*Example 4*

About 100 parts of a polyether (—OH number about 50) which has been prepared by the copolymerization of tetrahydrofuran, ethylene oxide, propylene oxide and epichlorohydrin, about 42 parts of an 80:20 mixture of 2,4- and 2,6-toluylene diisocyanate, about 1.0 part of a stannosiloxane having a refractive index $n_D^{20} = 1.4426$ and which has been prepared by the transesterification at about 130° C./12 mm. Hg of about 370 parts of 1,17-diethoxymethyl-nonasiloxane and about 351 parts of dibutyl-tin-diacetate with the addition of about 2 ml. of acetyl chloride (yield about 640 parts), about 1.2 parts of a basic silicone oil of the formula $$H_2N-CH_2-CH_2-O[(CH_3)_2SiO]_nCH_2CH_2NH_2$$

in which $n$ is an integer from 8 to 10 and which has been prepared as described in copending U.S. application Serial No. 851,956, about 0.2 part of endoethylene piperazine and about 3.3 parts of water are mechanically mixed. A foam material having good mechanical and elastic properties and which rises and hardens quickly is thereby obtained.

*Example 5*

About 59 parts of dibutyl-tin-diacetate are added dropwise to about 10 parts of methyl triethoxysilane and about 143.5 parts of 1,19-diethoxymethyldecasiloxane while stirring and at about 130° C. The acetic ester which is formed (about 29 parts) is distilled off. About 40.8 parts of the yellowish oil thereby obtained (refractive index $n_D^{20} = 1.4280$) are thereafter transesterified with about 50 parts of an anhydrous polyethylene glycol-propylene glycol-monoalkyl-ether (molecular weight about 1400) in 250 ml. of anhydrous toluene and in the presence of about 0.5 part of trifluoroacetic acid, ethanol being split off. A highly viscous oily stannosiloxane is obtained after distilling off all the volatile components at about 150° C./12 mm. Hg.

About 100 parts of the branched polypropylene glycol employed in Example 3, about 38 parts of the toluylene diisocyanate employed in Example 1, about 2.0 parts of the oily stannosiloxane catalyst prepared as described above, about 0.3 part of a water soluble, siloxane-alkylene oxide copolymer, about 0.7 part of 1-ethoxy-3-dimethylaminopropane and about 2.6 parts of water are mechanically mixed as described in Example 1. A foam material which rises and hardens quickly is thereby obtained.

*Example 6*

About 100 parts of the polypropylene glycol employed in Example 3, about 38 parts of the toluylene diisocyanate employed in Example 1, about 2.6 parts of water, about 0.5 part of 1-ethoxy-3-dimethylaminopropane, about 1.5 parts of a water soluble siloxane-alkylene oxide copolymer and about 1.0 part of a stannosiloxane prepared by the transesterification of about 44.5 parts of 1,3-diethoxy-tetramethyl-disiloxane and about 70.2 parts of dibutyl-tin-diacetate in the presence of about 0.5 ml. of acetyl chloride and at a maximum temperature of about 130° C. at about 13 mm. Hg with exclusion of moisture, are mechanically mixed and yield a quickly rising and setting foam having good physical properties.

*Example 7*

About 35.1 parts of dibutyl-tin-diacetate are initially esterified at about 130° C./12 mm. Hg with about 102 parts of $\alpha,\omega$-diethoxy-polydimethyl siloxane having a mean molecular weight of about 475 with the addition of about 0.5 ml. of acetyl chloride. About 105 parts of a stannosiloxane having a refractive index $n_D^{20} = 1.4292$ are obtained. About 36 parts of the stannosiloxane thus prepared are transesterified at a maximum temperature of about 170° C. at 12 mm. Hg with about 51 parts of a polyether having an —OH number of about 66 and which has been prepared by the addition of about 583 parts of ethylene oxide and about 650 parts of propylene oxide to about 1 mol of diethylene glycol monobutyl ether in the presence of alkali catalysts. About 69 parts of an alkylene oxide-stannosiloxane copolymer having a refractive index $n_D^{20} = 1.4612$ are thereby obtained.

About 100 parts of the polypropylene glycol employed in Example 3, about 38 parts of the toluylene diisocyanate employed in Example 1, about 1.6 parts of water, about 0.5 part of 1-ethoxy-3-dimethylaminopropane, about 2.0 parts of dibutyl tin-dilaurate, about 0.5 part of the catalyst prepared as described above and about 0.2 part of a 50 percent aqueous solution of a ricinoleic acid-sodium sulphonate are mechanically mixed. A rather coarse-pored foam having good strength properties is thereby obtained.

*Example 8*

About 100 parts of the polypropylene glycol employed in Example 3, about 38 parts of the toluylene diisocyanate employed in Example 1, about 2.6 parts of water, about 1.2 parts of 1-ethoxy-3-dimethylaminopropane and about 2.0 parts of a stannosiloxane having a refractive index $n_D^{20} = 1.4055$ and which has been prepared by the transesterification of about 46.3 parts of dioctyl-tin-diacetate with about 95 parts of $\alpha,\omega$-diethoxypolydimethyl-siloxane (mean molecular weight about 475) in the presence of about 0.5 ml. of acetyl chloride at about 170° C./12 mm.

Hg and solidifies on standing for a relatively long period, are mixed together and produce a foam material which rises and sets quickly, but which has substantially closed pores.

Similar foam materials can be obtained by using approximately equimolar quantities of dibenzyl-tin-diacetate instead of dioctyl-tin-diacetate.

*Example 9*

About 170 parts of 1,19-diethoxymethyl-decasiloxane are added dropwise at about 160° C. and while stirring to about 35 parts of dibutyl-tin-diacetate and then about 24 ml. of acetic acid methyl ester which are formed in a molar ratio of about 2:1 are distilled off. A clear yellowish liquid stannosiloxane is obtained having a refractive index $n_D^{20} = 1.4161$. The stannosiloxane contains about 4.7 percent of $OC_2H_5$ (calculated about 4.9 percent).

About 36.2 parts of this stannosiloxane are then reacted under reflux while stirring with about 50 parts of a polyalkylene glycol ether having a molecular weight of about 1400. The reaction is carried out in about 250 ml. of toluene and in the presence of about 1.0 part of trichloroacetic acid. The polyether stannosiloxane thus obtained is freed from volatile fractions and solvents by distillation at a maximum temperature of about 150° C./12 mm. Hg. The polyether stannosiloxane is obtained in the form of a yellowish-brown viscous liquid and is employed as a catalyst and stabilizer in this example. The polyalkylene glycol ether employed in this example was prepared by adding ethylene oxide and propylene oxide in a molar ratio of about 4:3 to n-butanol.

About 100 parts of the polypropylene glycol employed in Example 2, about 35 parts of the toluylene diisocyanate employed in Example 1, about 2.6 parts of water, about 0.6 part of endoethylene piperazine and about 1.5 parts of the catalyst prepared as described above are mechanically mixed and yield a highly elastic foam material having a bulk density of about 35 kg./m.³

*Example 10*

About 306 parts of acetic acid anhydride are added with stirring to a mixture of about 178 parts of methyl triethoxysilane and about 518 parts of 1,13-diethoxymethylheptasiloxane. The mixture is kept at a temperature of about 130° C. and the acetic acid ethyl ester which is formed in a molar ratio of about 1:3:3 is distilled off. A methylethoxypolysiloxane having an $OC_2H_5$ content of about 7.2 percent is obtained corresponding to a molecular weight of about 1874. About 37.3 parts of 1,19-diethoxymethyl-decasiloxane are added to about 80 parts of the methylethoxypolysiloxane and then about 15 parts of dibutyl-tin-diacetate are added dropwise at about 170° C. After distilling off about 9 ml. of acetic acid ethyl ester, there remains a yellowish thinly liquid stannosiloxane having a refractive index $n_D^{20} = 1.4124$. The stannosiloxane contains about 4.3 percent of $OC_2H_5$ (calculated about 4.6 percent).

About 50 parts by weight of this reaction product are reacted, in a manner analogous to that of Example 9, with about 68 parts of the ethylene oxide-propylene oxide mixed polyether employed in Example 1 to give a highly viscous condensation product which is employed as a catalyst and stabilizer in this example.

About 100 parts of the polypropylene glycol employed in Example 2, about 35 parts of the toluylene diisocyanate employed in Example 1, about 2.6 parts of water, about 0.2 part of endoethylene piperazine, about 0.2 part of dibutyl-tin-dilaurate and about 1.5 parts of the catalyst prepared as described above are mechanically mixed in the apparatus described in U.S. Reissue Patent 24,514. A rapidly rising and setting foam material having good mechanical properties is thereby obtained.

*Example 11*

About 35.1 parts of dibutyl-tin-diacetate are added dropwise to a mixture of about 62.4 parts of the initial polysiloxane stage according to Example 10 and about 84.8 parts of 1,19-diethoxy-methyldecasiloxane. The mixture is maintained at a temperature of about 170° C. throughout the addition of the dibutyl-tin-diacetate and a quantity of acetic acid ethyl ester corresponding to a molar ratio of about 1:3:3 is distilled off. In addition to a somewhat jelly-like substance, there is obtained a thinly liquid stannosiloxane containing about 2.7 percent of $OC_2H_5$ (calculated about 2.7 percent).

About 48.5 parts of this stannosiloxane are reacted in a manner analogous to that of Example 9 with about 41 parts of the polyethylene glycol-propylene glycol ether employed in Example 9 to give a highly viscous condensation product which is employed as a catalyst and stabilizer in this example.

About 100 parts of the polypropylene glycol employed in Example 2, about 35 parts of the toluylene diisocyanate employed in Example 1, about 2.6 parts of water, about 0.2 part of endoethylene piperazine, about 0.2 parts of dibutyl-tin-dilaurate and about 1.5 parts of the catalyst prepared as described above yield a foam material having similar properties to those of the foam material produced as described in Example 10.

*Example 12*

About 11.4 parts of pentaethoxy-1,3,5-triphenyl-trisiloxane are reacted with about 70 parts of 1,19-diethoxymethyl-decasiloxane and about 28 parts of dibutyl-tin-diacetate at about 170–180° C., acetic acid ethyl ester being distilled off to provide a viscous stannosiloxane containing about 4.4 percent of $OC_2H_5$ (calculated about 4.7 percent). About 8.6 grams of this reaction product are reacted in a manner analogous to that of Example 9 with about 16 parts of the polyethylene glycol-propylene glycol ether described in Example 9 and in the presence of about 1 percent of trifluoroacetic acid to provide a paste-like stannosiloxane-alkylene oxide copolymer which is employed as a catalyst and stabilizer in this example.

About 100 parts of the polypropylene glycol employed in Example 3, about 35 parts of the toluylene diisocyanate employed in Example 1, about 2.6 parts of water, about 0.2 part of endoethylene piperazine, about 0.2 part of dibutyl-tin-dilaurate and about 1.5 parts of the previously described stannosiloxane are mechanically mixed to yield a foam material which rises in about 1.5 minutes, has good elastic properties and which sets completely after about 20 minutes.

*Example 13*

About 34.6 parts of tetraethoxy-1,3-diphenyl-disiloxane and about 50 parts of 1,19-diethoxymethyl-decasiloxane are reacted at about 170–180° C. with about 20 parts of dibutyl-tin-diacetate, acetic acid ethyl ester being distilled off. Thereafter, approximately another 50 parts of 1,19-diethoxy-dimethyl-decasiloxane and about 5.8 parts of acetic acid anhydride are added. After completely removing the acetic ester which is formed, there is left a residue consisting of a clear, yellow liquid having a refractive index $n_D^{20} = 1.4158$. About 42 parts of this stannosiloxane are then reacted as described in Example 9 with about 93.3 parts of the polyethylene glycol-propylene glycol ether described therein, using sodium ethylate as catalyst, to provide a yellow oil which is employed as a catalyst and stabilizer in this example.

About 100 parts of the polypropylene glycol employed in Example 2, about 35 parts of the toluylene diisocyanate employed in Example 1, about 2.6 parts of water, about 0.2 part of endoethylene piperazine, about 0.2 part of dibutyl-tin-dilaurate and about 1.5 parts of the stannosiloxane prepared as described above yield a highly elastic foam material on being foamed.

*Example 14*

About 100 parts of a polyether isocyanate obtained by reacting about 100 parts of a linear polypropylene glycol (—OH number about 56) with about 32 parts of the toluylene diisocyanate employed in Example 1, about 1.6 parts of permethylated N-aminoethyl-piperazine, about 2.0 parts of water and about 1.0 part of the stannosiloxane prepared as described in Example 13 yield, on foaming, a quickly rising and setting foam material.

*Example 15*

About 100 parts of a polyester (—OH number about 60.2; acid number about 1.3; viscosity about 17,900 cp./25° C.), obtained by esterifying adipic acid, trimethylol propane and diethylene glycol, about 35.5 parts of a toluylene diisocyanate containing the 2,4- and 2,6-isomers in a ratio of 65:35, about 1.0 part of water, about 1.0 part of dimethylbenzylamine, about 1.0 part of a 50 percent aqueous solution of castor oil sulphate, about 2.0 parts of a 50 percent solution of a water soluble benzylhydroxydiphenyl polyethylene glycol ether and about 1.0 part of the stannosiloxane prepared as described in Example 10, are mechanically mixed in the apparatus described in U.S. Reissue Patent 24,514. A foam material which rises in about 1 minute, sets after approximately 10–15 minutes and which has good elasticity and strength is thereby obtained.

It is to be understood that any other suitable organic polyisocyanate, organic compound containing at least two active hydrogen containing groups, silicone compound containing tin or other additive or reactant, as more particularly set forth above could have been used in the foregoing examples with satisfactory results.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. The method of simultaneously catalyzing and stabilizing the reaction between an organic polyisocyanate and an organic compound containing at least two active hydrogen containing groups as determined by the Zerewitinoff method in the presence of a blowing agent leading to the production of a cellular polyurethane which comprises conducting said reaction in the presence of a silicon compound having the formula

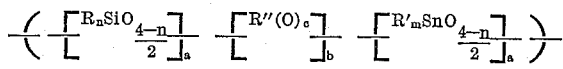

wherein R and R′ are monovalent organic radicals, R″ is a polyvalent organic radical obtained by removing the hydroxyl groups from a polyhydric alcohol having from 2 to 6 free hydroxyl groups, $a$ is a positive integer, $b$ is selected from the group consisting of 0 and a positive integer, $c$ is 1 to 5 and $n$ and $m$ are 1 to 3.

2. The method of claim 1 wherein R is methyl.
3. The method of claim 1 wherein R is phenyl.
4. The method of claim 1 wherein R′ is butyl.
5. The method of claim 1 wherein R′ is actyl.
6. The method of claim 1 wherein said organic compound containing at least two active hydrogen containing groups is a polyhydric polyalkylene ether.
7. The method of claim 1 wherein said organic compound containing at least two active hydrogen containing groups is a polyhydric polyalkylene ether containing predominately secondary hydroxyl groups.
8. In a process for the production of cellular polyurethane plastics wherein an organic polyisocyanate is reacted with an organic compound containing at least two active hydrogen containing groups as determined by the Zerewitinoff method in the presence of a blowing agent, the improvement which comprises conducting the reaction in the presence of a silicone compound containing chemically combined tin which comprises groups having the formula (A) 

and (B) 

wherein R and R′ are selected from the group consisting of alkyl and aryl and $n$ and $m$ are integers of from 1 to 3 and (A) and (B) are linked together by oxygen.

9. The process of claim 8 wherein R is phenyl.
10. The process of claim 8 wherein R is methyl.
11. The process of claim 8 wherein said tin is tetravalent tin.

References Cited in the file of this patent

UNITED STATES PATENTS 2,955,056   Knox _____ Oct. 4, 1960

OTHER REFERENCES

Alexander: Colloid Chemistry, volume VI, Reinhold, New York (1946), pages 217–218.